United States Patent [19]

Barbezat et al.

[11] 3,723,499
[45] Mar. 27, 1973

[54] PROCESS FOR THE PRODUCTION OF CYANOACETIC ACID

[75] Inventors: Pierre Barbezat; Colm O. Murchu, both of Visp, Switzerland

[73] Assignee: Lonza Ltd., Gampel/Valais, Switzerland

[22] Filed: June 18, 1971

[21] Appl. No.: 154,683

[30] Foreign Application Priority Data

June 19, 1970 Switzerland..........................9301/70

[52] U.S. Cl................................................260/465.4
[51] Int. Cl..............................................C07c 121/40
[58] Field of Search....................................260/465.4

[56] References Cited

UNITED STATES PATENTS 3,577,455  5/1971  Jones et al......................260/465.1 X
2,338,834  1/1944  Britton et al. ......................260/465.4

OTHER PUBLICATIONS

Groggins; Unit Processes in Organic Chemistry, (1958), page 753
Migrdichian; Organic Synthesis, Vol. 1, (1957) pages 336–337
Noller; Chemistry of Organic Compounds, 2nd ed. (1957) page 170
Karrer; Organic Chemistry, (1950) page 212
Trakhtenberg et al., C.A., (38), 1944, page 3248
Inglis; Org. Syn. Coll. Vol. 1, (1941) pages 254–256
Phelps, et al., C.A. (3), 1909, page 1533
Phelps, et al., C.A., (3), 1909, page 1534

Primary Examiner—Joseph P. Brust
Attorney—Eric H. Waters et al.

[57] ABSTRACT

Cyanoacetic acid is prepared from a cyanoacetic ester by said hydrolysis with aqueous hydrochloric acid in a molar ratio of 1:0.25 - 0.55 at a temperature of 50° - 100°C.

6 Claims, No Drawings

PROCESS FOR THE PRODUCTION OF CYANOACETIC ACID

BACKGROUND OF THE INVENTION

1. Field of the Invention

The invention relates to a process for the production of cyanoacetic acid from a cyanoacetic ester by acidic hydrolysis.

2. Prior Art

It is known to prepare cyanoacetic acid from cyanoacetic ester by acidic hydrolysis with nitric acid. The yields amount to about 88 percent, the degree of purity of the obtained yellowish produce is only 88.5 percent (Chemical Abstracts 38, 3248).

It is further known that cyanoacetic esters are converted into the corresponding malonic esters with the aid of hydrochloric acid by hydrolysis of the CN group (Chemical Abstracts 3 (1909) 1,533–1,534). If the process is carried out with concentrated hydrochloric acid, the speed at which the nitrile group of the aliphatic nitriles is hydrolyzed is so high that the reaction is exothermic and must be moderated by cooling (Houben-Weyl, Vol. 8, page 429).

It is also known that free cyanoacetic acid can be liberated from its sodium salt by means of hydrochloric acid. In this operation, temperatures above 60° – 70°C must be avoided, since otherwise decomposition of the cyanoacetic acid occurs (org. Synt. Coll. Vol. 1, pages 254–255).

DETAILED DESCRIPTION

The present invention has for an object the preparation of cyanoacetic acid from a cyanoacetic ester with such a high degree of purity that additional purification can be dispensed with. This is achieved according to the invention by treating the cyanoacetic ester with aqueous hydrochloric acid in a molar ratio of 1:0.25–0.55 based on HCl, at a temperature of 50° – 100°C.

The alcohol moiety in the cyanoacetic ester is an alkyl group, preferably with one to six carbon atoms.

A molar ratio of cyanoacetic ester to HCl of 1:0.35 – 0.45 and a temperature of 80° – 100°C is preferred.

It is expedient to adjust the concentration of the aqueous hydrochloric acid in such a way that 10–15 mol of water are present in the reaction mixture for every mol of cyanoacetic ester.

When the reaction is completed (after about 10 – 20 minutes), the water and the hydrochloric acid are removed in a vacuum; it is expedient to increase the vacuum stepwise. The crude cyanoacetic acid remaining behind is pure white and has a degree of purity of 97 – 98 percent.

Considering the known state of the art, it is surprising that the process according to the invention does not lead to hydrolysis of the CN group by the HCl and that the high temperature applied does not lead to destruction of the cyanoacetic acid.

Cyanoacetic acid is a compound suitable for many uses, especially for the production of dyestuffs, synthetic resins and pharmaceutical agents.

EXAMPLE 99 g (1 mol) of cyanoacetic acid methyl ester were heated with 200 ml of water and 0.4 mol of hydrochloric acid at 80° – 90°C for 10 minutes. The reaction mixture was subsequently concentrated by evaporation in a gradually increasing vacuum.

The yield of cyanoacetic acid (degree of purity 97 percent) amounted to 96.5 percent, referred to the pure product.

Cyanoacetic acid can similarly be prepared from other cyanoacetic esters where the alcohol moiety is other than methyl, for example, those esters of alcohols containing up to six carbon atoms.

What is claimed is:

1. A process for the production of cyanoacetic acid from a cyanoacetic ester by acidic hydrolysis, comprising treating a cyanoacetic ester with aqueous hydrochloric acid in a molar ratio of 1:0.25 – 0.55, based on HCl, at a temperature of 50° – 100°C in the presence of 10–15 moles of water per mole of cyanoacetic ester and wherein the alcohol moiety in the ester is an alkyl group having one to six carbon atoms.

2. A process according to claim 1, wherein the molar ratio of the cyanoacetic ester to HCl is 1:0.35 – 0.45.

3. A process according to claim 1 wherein the temperature is 80° – 100°C.

4. A process according to claim 2 wherein the temperature is 80° – 100°C.

5. A process according to claim 1 wherein the cyanoacetic ester is cyanoacetic acid methyl ester.

6. A process according to claim 1 wherein the reaction mixture is evaporated under vacuum after completion of the reaction leaving a crystalline residue of cyanoacetic acid.

* * * * *